US012647524B2

(12) United States Patent
Govindaraju et al.

(10) Patent No.: US 12,647,524 B2
(45) Date of Patent: Jun. 2, 2026

(54) DEVICE AND METHOD FOR PLAYING AUDIO AT A CONNECTED AUDIO DEVICE

(71) Applicant: ZEBRA TECHNOLOGIES CORPORATION, Lincolnshire, IL (US)

(72) Inventors: Vinod Govindaraju, Cumberland, RI (US); David A. Langevin, Warwich, RI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/373,064

(22) Filed: Sep. 26, 2023

(65) Prior Publication Data

US 2024/0022672 A1 Jan. 18, 2024

Related U.S. Application Data

(63) Continuation-in-part of application No. PCT/US2022/021264, filed on Mar. 22, 2022, which is a continuation of application No. 17/221,434, filed on Apr. 2, 2021, now abandoned.

(51) Int. Cl.
| *G06F 15/00* | (2006.01) |
| *G06K 15/00* | (2006.01) |
| *H04N 1/00* | (2006.01) |
| *H04W 4/80* | (2018.01) |

(52) U.S. Cl.
CPC ....... *H04N 1/00323* (2013.01); *G06K 15/007* (2013.01); *H04W 4/80* (2018.02)

(58) Field of Classification Search
None
See application file for complete search history.

(56) References Cited

U.S. PATENT DOCUMENTS

| 10,834,279 | B1 * | 11/2020 | Jensen | .................... G06F 3/167 |
| 11,310,693 | B2 | 4/2022 | ElArabawy et al. | |
| 2011/0096359 | A1 * | 4/2011 | Taniuchi | ................. G06F 3/126 |
| | | | | 358/1.15 |
| 2012/0307289 | A1 * | 12/2012 | Ritland | ................. G06F 3/1259 |
| | | | | 358/1.15 |
| 2020/0053238 | A1 * | 2/2020 | Morioka | ................. G06F 3/165 |
| 2021/0104239 | A1 * | 4/2021 | Miyazaki | ................ G10L 15/26 |
| 2021/0303264 | A1 | 9/2021 | Ban et al. | |
| 2022/0084540 | A1 | 3/2022 | Kim et al. | |

OTHER PUBLICATIONS

International Search Report and Written Opinion for International Application No. PCT/US2022/021264 mailed on May 2, 2022.
Office Action for U.S. Appl. No. 17/221,434 mailed on Apr. 26, 2022.

* cited by examiner

*Primary Examiner* — Mark R Milia

(57) ABSTRACT

An example printing device comprises: a memory configured to store audio files corresponding to printing device events; a communications interface configured to communicate with an audio device; a processor interconnected with the memory and the communications interface, the processor configured to: responsive to a printing device event, retrieve, from the memory, an audio file corresponding to the printing device event; and transmit via the communications interface, the audio file to the audio device.

12 Claims, 6 Drawing Sheets

300

305
Identify occurrence of printing device event

310
Retrieve audio descriptor

315
Transmit audio descriptor to audio device

104

220
Event Management System

224
Input/Output Devices

320

200
Processor

204
Memory

208

330

325

108
Audio Device

216
Comms. Interface

330

212

600

605
Receive audio control data

610
Transmit audio control data
to audio device

DEVICE AND METHOD FOR PLAYING AUDIO AT A CONNECTED AUDIO DEVICE

RELATED APPLICATIONS

The present application is a continuation-in-part of International Patent Application No. PCT/US2022/21264, filed on Mar. 22, 2022, which claims priority to and the benefit of U.S. patent application Ser. No. 17/221,434, filed on Apr. 2, 2021, the contents of each are incorporated by reference herein in their entirety.

BACKGROUND

Printing devices may experience printing device events which may trigger warnings, errors, or notifications. However, nearby personnel may not notice these events if they are distracted or far away from the printing device, and the warnings, errors and notifications may go unnoticed.

SUMMARY

The below disclosure describes an example printing device comprising: a memory configured to store audio files corresponding to printing device events; a communications interface configured to communicate with an audio device; a processor interconnected with the memory and the communications interface, the processor configured to: responsive to a printing device event, retrieve, from the memory, an audio file corresponding to the printing device event; and transmit via the communications interface, the audio file to the audio device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
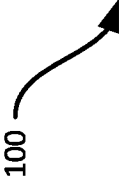
FIG. 1 is a diagram illustrating system for playing audio at a connected audio device.
Figure 1:
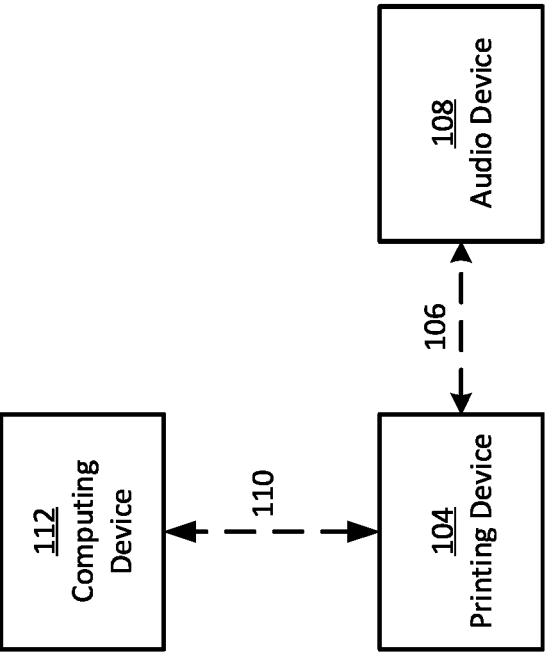

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a printing device comprising: a memory configured to store audio files corresponding to printing device events; a communications interface configured to communicate with an audio device; a processor interconnected with the memory and the communications interface, the processor configured to: responsive to a printing device event, retrieve, from the memory, an audio file corresponding to the printing device event; and transmit via the communications interface, the audio file to the audio device.

Additional examples disclosed herein are directed to a method including: storing audio files corresponding to printing device events; responsive to a printing device event, retrieving an audio file corresponding to the printing device event; and transmitting the audio file to a connected audio device.

FIG. 1 depicts an example system 100 for playing audio at a connected audio device. The system 100 includes a printing device 104 in communication with an audio device 108 and may optionally include an additional computing device 112. The system can include several printing devices each being in communication with the audio device 108 or one or more different audio devices. The system 100 is generally configured to prompt, by the printing device 104, an audio signal to be played at a connected audio device. In particular, the audio signal may be an audio file corresponding to a specific printing device event (e.g., such as an audio descriptor describing the printing device event), a task to be completed by a user in response to the specific printing device event (where the task is to be performed via an interface of the printing device 104 and/or to be performed apart from and without interacting with the printing device 104), a task to be performed based on a determined location of the printing device 104, an identity of the user logged into the printing device 104, a task being performed by the user, feedback received from the printing device about an operation of the printing device 104 and/or about an operation of the audio device 108, and/or any combination thereof. By playing it at a connected audio device, such as speakers, headphones, cochlear implant, or the like, the printing device 104 may provide key information to nearby personnel in real-time. The printing device 104 can also be configured to provide feedback to the computing device 112, for example, after sending the audio file to the connected audio device and/or receiving an acknowledgement signal from the connected audio device 108 that the audio file was played by the audio device 108, upon receiving a fail signal from the audio device 108 indicating that the audio file failed to be played by the audio device 108, and/or in response to a user performing one or more action on the printing device 104 after the audio file sent to the audio device 108 and/or after confirmation that the audio file was played by the audio device 108 (e.g., based on receipt of the acknowledgement signal).

The printing device 104 may be a device such as a printer, a printer-encoder, a media processing device, a scanner, or other devices. The printing device 104 is in communication with the audio device 108 over a communication link 106. The communication link 106 may be a wireless communication link, and preferably may employ a short-range wireless radio frequency communications protocol, such as Bluetooth or the like. The audio device 108 may be any suitable audio device, including speakers, headsets, headphones, cochlear implants, or similar.

The computing device 112 may be a computing device such as a server, a desktop computer, a laptop computer, or a mobile computing device, such as a tablet, a mobile phone, or the like. The computing device 112 may also be in communication with the printing device 104 over a communication link 110. The communication link 110 may be a wired or wireless communication link, or a combination of wired and wireless links traversing one or more networks, including the Internet, mobile networks, and other wide-area networks or the like. For example, the computing device 112 may be a server located remote from the printing device 104. While the computing device 112 is depicted in the present example, in other examples, the printing device 104 may carry out the audio playback operation described herein without the computing device 112, and hence the system 100 need not include the computing device 112.

Figure 2:
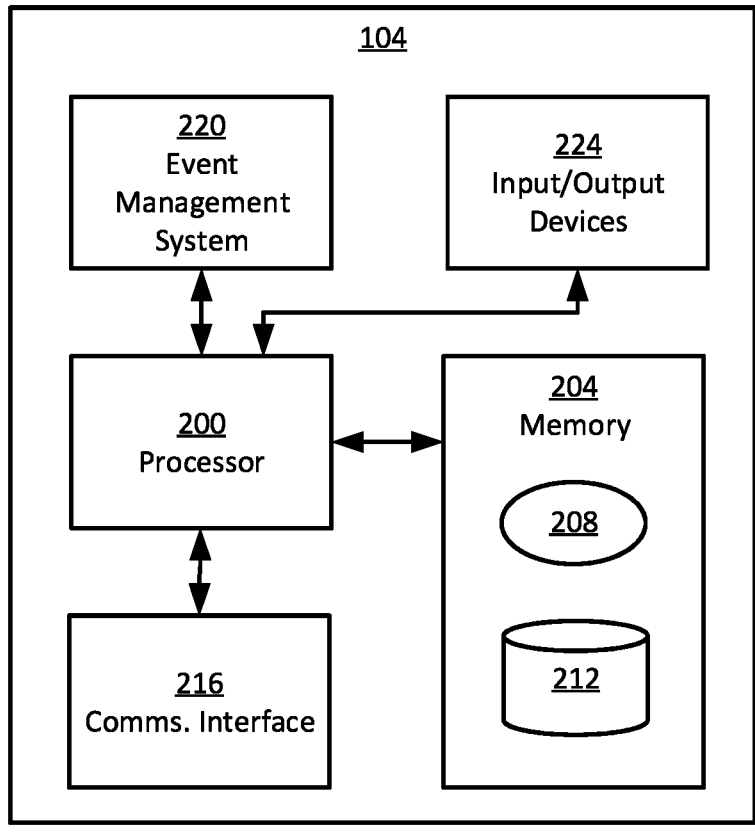
FIG. 2 is a block diagram of certain internal hardware components of the printing device of FIG. 1.

Referring to FIG. 2, the printing device 104, including certain internal components, is shown in greater detail. The printing device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits.

The memory 204 stores computer-readable instructions for execution by the processor 200. In particular, the memory 204 stores an application 208 which, when executed by the processor 200, configures the processor 200 to perform various functions discussed below in greater detail and related to the audio playback operation. The application 208 may also be implemented as a suite of distinct applications. The memory 204 also includes a repository 212 storing rules and data for the audio playback operation. For example, the repository 212 may store audio files, as well as associations between the audio files and the printing device events. The audio files may be, for example audio wave files representing audio descriptions of the printing device events. For example, for a print job complete printing device event, the repository 212 may track an association to an audio file which includes a wave file describing "print job complete." Similarly, for a paper jam printing device event, the repository 212 may track an association to an audio file which includes a wave file describing "a paper jam has occurred." In addition to specific audio files corresponding to specific descriptors of the printing device events, the repository 212 may store generic audio files corresponding to generic descriptors for different types of printing device events. For example, the repository 212 may store an audio file which includes a wave file describing "an error has occurred at the printer," which may be used for printing device events identified as an error, but not having a specifically associated audio descriptor. In some examples, in addition to phrases or announcements, the audio file may include other audio signals such as tones, chimes, tunes, or the like. In some examples, the associations between the audio files and the printing device events or event types may be defined based on user input received from a user at a user interface (i.e., an input devices) of the printing device 104.

Those skilled in the art will appreciate that the functionality implemented by the processor 200 may also be implemented by one or more specially designed hardware and firmware components, such as a field-programmable gate array (FPGAs), application-specific integrated circuits (ASICs) and the like in other embodiments. In an embodiment, the processor 200 may be, respectively, a special purpose processor which may be implemented via dedicated logic circuitry of an ASIC, an FPGA, or the like in order to enhance the processing speed of the dimensioning operations discussed herein.

The printing device 104 also includes a communications interface 216 interconnected with the processor 200. The communications interface 216 includes suitable hardware (e.g. transmitters, receivers, network interface controllers and the like) allowing the printing device 104 to communicate with other computing devices—such as the device 108—via the link 106. The specific components of the communications interface 216 are selected based on the type of network or other links that the printing device 104 is to communicate over.

The printing device 104 may further include an event management system 220. The event management system 220 may be interconnected with other components of the printing device 104, such as printheads, trays, covers, sensors, memory, batteries, option cards, verifiers, etc.; print media such as labels, tags, wristbands, cards, inlays, ink supplies, etc.; and media handling components such as platens, spindles, trays, rewinders, cutters, RFID encoders, magnetic stripe encoders, overlaminate transfer assemblies, cleaning rollers and the like for detecting and tracking printing device events. The event management system 220 may receive signals from the functional components of the printing device 104 to detect and track printing device events, including errors (e.g., paper jams, out of ink/paper), warning conditions (e.g., low on ink/paper), status updates (e.g., print job initiated, print job complete), and the like. The processor 200 may subscribe to the event management system 220 to receive notifications from the event management system 220 upon occurrences of printing device events.

The processor 200 may also be connected to one or more input and/or output devices 224. The input devices can include one or more touch-sensitive display screens, buttons, keypads, or other suitable user interfaces. The output devices can further include one or more display screens, sound generators, lights, or the like for providing output or feedback to an operator.

Figure 3A:
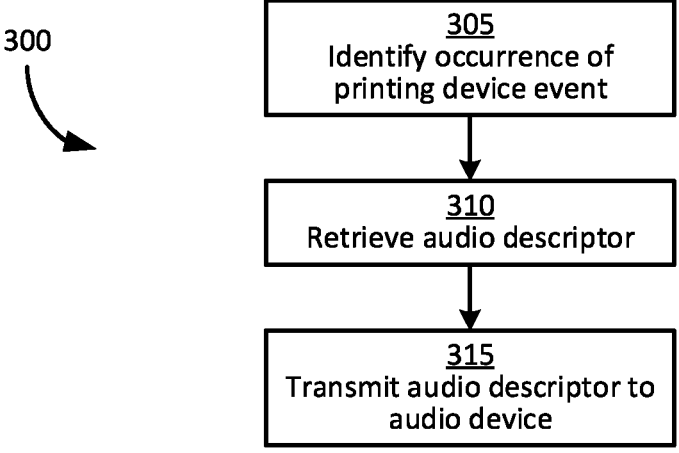
FIG. 3A is a flowchart of a method of playing audio at a connected audio device.

The functionality of the printing device 104, as implemented via execution of the applications 208 by the processor 200 will now be described in greater detail, with reference to FIGS. 3A and 3B. FIG. 3A illustrates a method 300 of causing audio playback at a connected audio device, which will be described in conjunction with its performance in the system 100, and in particular, by the printing device 104, with reference to the components illustrated in FIGS. 1 and 2.

At block 305, the printing device 104 identifies an occurrence of a printing device event. For example, to identify the occurrence of a printing device event, the processor 200 may subscribe to the event management system 220. When a printing device event occurs, the event management system 220 may send a notification to the processor 200 regarding the occurrence of the printing device event. In other examples, the processor 200 may be connected to the sensors and other internal components of the printing device 104 directly to identify printing device events.

At block 310, the printing device 104 retrieves an audio file corresponding to the printing device event. For example, the processor 200 may check the repository 212 to determine whether the printing device event identified at block 305 has a specific audio file associated with it. If the repository 212 tracks an association between the printing device event and an audio file, the processor 200 may retrieve the associated audio file. If no specific audio file is associated with the printing device event identified at block 305, the processor 200 may identify a type of the printing device event. For example, types of printing device events may include errors, notifications, status updates, and the like. The processor 200 may check the repository 212 to determine whether the type of printing device event identified at block 305 has a generic audio file associated with it. If the repository 212 tracks an association between the type of printing device event and an audio file, the processor may retrieve the associated audio file. If the repository 212 does not include specific audio files associated with the printing device event or generic audio files associated with the type of printing device event, the method 300 may end.

At block 315, the printing device 104 transmits the audio file retrieved at block 310 to the audio device 108. In some examples, the printing device 104 may perform some pre-processing on the audio file, for example to convert it to a format recognizable and accessible by the audio device 108. The formats may vary depending on the capabilities of the audio device 108 and the type of communication link 106. For example, when the communication link 106 utilizes a Bluetooth communication protocol, the processor 200 may convert the audio file to a low-complexity subband codec format to be sent to the audio device 108. Further, in addition to the audio file, the printing device 104 may transmit a command to the audio device 108 to play the transmitted audio file. In an embodiment, the audio file may be transmitted using an Advanced Audio Distribution Profile (A2DP) over a radio-frequency wireless connection utilizing the Bluetooth communication protocol. The printing device 104 can also be configured to provide feedback to the computing device 112, for example, after sending the audio file to the connected audio device and/or receiving an acknowledgement signal from the connected audio device 108 that the audio file was played by the audio device 108, upon receiving a fail signal from the audio device 108 indicating that the audio file failed to be played by the audio device 108, and/or in response to a user performing one or more action on the printing device 104 after the audio file sent to the audio device 108 and/or after confirmation that the audio file was played by the audio device 108 (e.g., based on receipt of the acknowledgement signal).

Figure 3B:
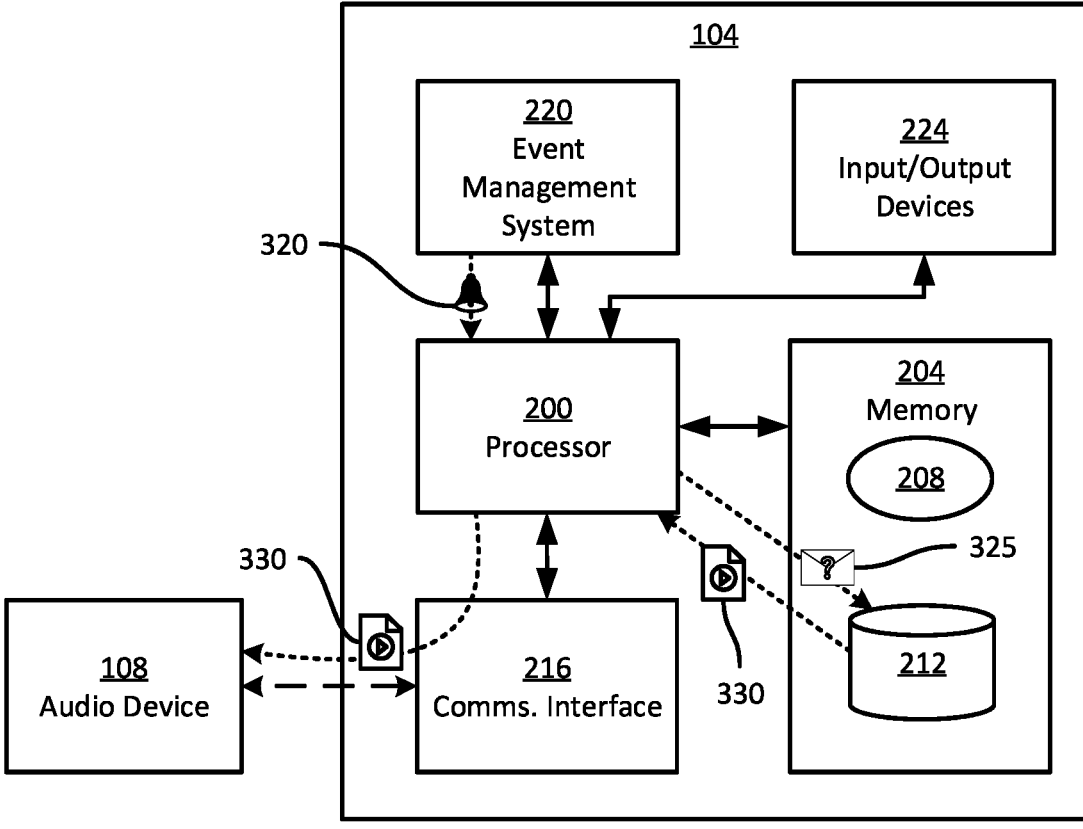
FIG. 3B is a schematic diagram of an example performance of the method of FIG. 3A.

For example, referring to FIG. 3B, the processor 200 may receive a notification 320 from the event management system 220 (i.e., at block 305). The notification 320 may indicate that a printing device event has occurred and may further include details pertaining to the printing device event, including the specific printing device event identified by an identifier or code (e.g., an error code indicating a paper jam), the time of occurrence, and other printing device event information such as the type of event (e.g., error, notification, status update, etc.). Responsive to the printing device event, the processor 200 may send a request 325 at block 310, to the repository 212 for audio file associated with the printing device event. If such an audio file exists, the processor 200 receives the audio file 330 from the repository

212. The audio file 330 may be a specific audio descriptor of the printing device event, a generic audio descriptor of the type of printing device event, a tone, a tune, or other audio clip. After retrieving audio file 330, the processor 200 transmits the audio file 330 to the audio device 108 via the communications interface 216. Upon receipt of the audio file 330, the audio device 108 may play the audio file 330.

Figure 4A:
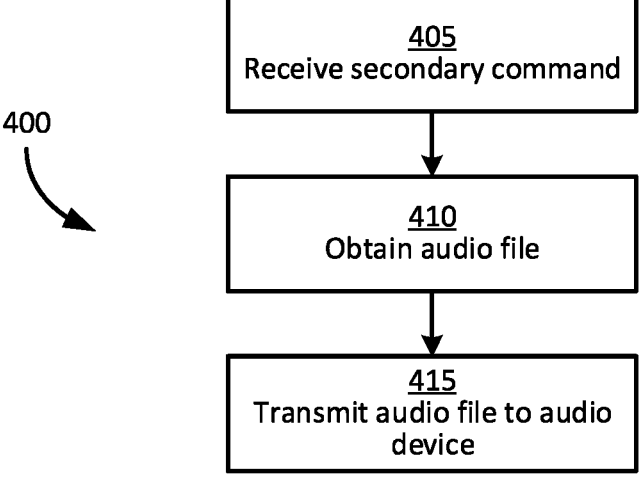
FIG. 4A is a flowchart of another method of playing audio at a connected audio device.

Turning now to FIG. 4A, a method 400 of causing audio playback at a connected audio device is depicted. The method 400 will be described in conjunction with its performance in the system 100, and in particular by the printing device 104.

At block 405, the printing device 104 receives a secondary command to play audio at the audio device 108. The secondary command may be input from an operator of the printing device 104 received, for example, via one of the input devices 224. In other examples, the secondary command may be received from an external computing device, such as the computing device 112 (e.g., a server, a desktop computer, a mobile phone, or the like).

At block 410, the printing device 104 obtains a secondary audio file corresponding to the secondary command. For example, the secondary command may include an indication of a selected audio file to retrieve from the repository 212 to be transmitted and played at the audio device 108 as the secondary audio file. That is, a user may use the input device 224 to select a specific audio file to be played at the audio device 108. Alternately, the printing device 104 may receive the secondary command from the external computing device 112 including a selected audio file. Upon receiving the selection, the processor 200 may retrieve the selected audio file from the repository 212. In some examples, when the secondary command is received from the external computing device 112, the secondary command may include the secondary audio file to be transmitted and played at the audio device. That is, rather than being stored in the repository 212, the secondary audio file may be stored at the external computing device 112 or elsewhere, and transmitted to the printing device 104 with the secondary command in real time when the secondary audio file is to be played at the audio device 108.

At block 415, the printing device 104 transmits the secondary audio file obtained at block 410 to the audio device 108. In some examples, the printing device 104 may perform some preprocessing on the secondary audio file, for example to convert it to a format recognizable and accessible by the audio device 108. The formats may vary depending on the capabilities of the audio device 108 and the type of communication link 106. In addition to the secondary audio file, the printing device 104 may transmit a command to the audio device 108 to play the transmitted secondary audio file. Upon receipt of the command and the secondary audio file, the audio device 108 may play the secondary audio file.

Figure 4B:
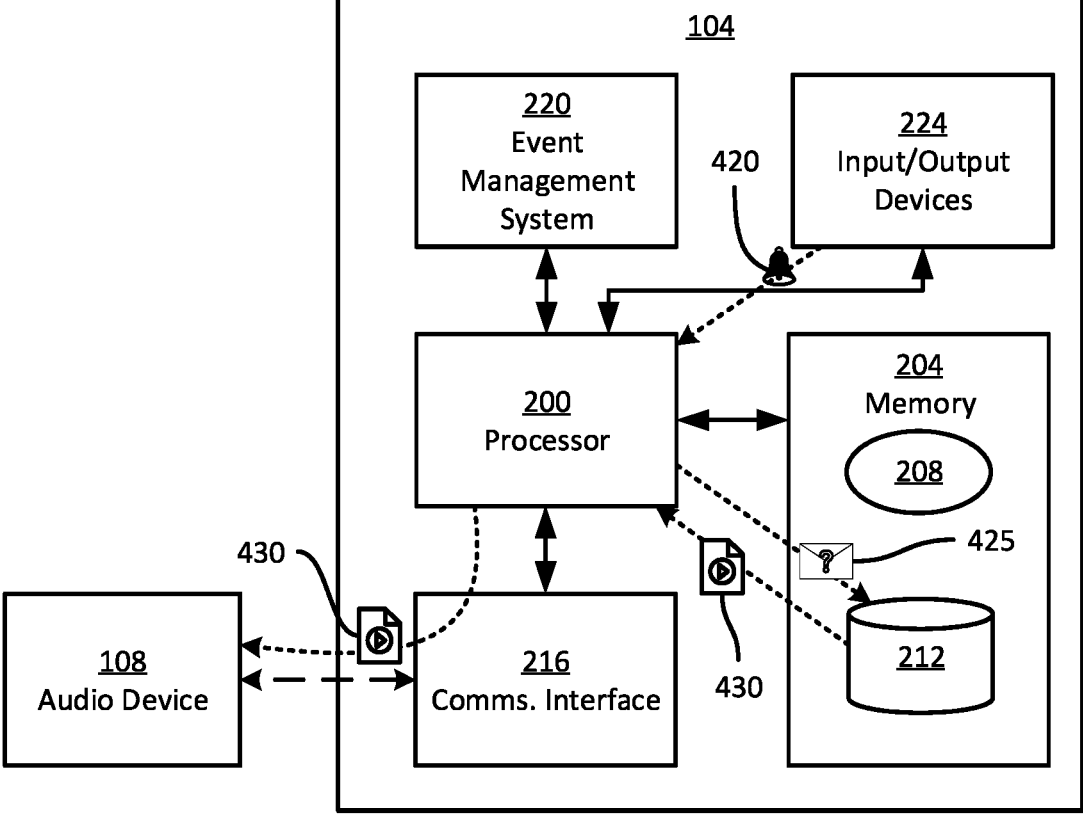
FIG. 4B is a schematic diagram of an example performance of the method of FIG. 4A.

For example, referring to FIG. 4B, the processor 200 may receive a secondary command 420 from the input device 224 (i.e., at block 405). The secondary command 420 may include an indication of a particular audio file to be played at the audio device 108 (e.g., as represented by a particular file identifier). In particular, the user interface for selecting the secondary audio file via the input device 224 may be controlled to allow a user to select only an audio file stored in the repository 212. Responsive to the secondary command 420, the processor 200 may send a request 425 (i.e., at block 410) to the repository 212 for the selected audio file. The processor 200 then receives the audio file 430 corresponding to the secondary command 420 from the repository 212. After retrieving the audio file 430, the processor 200 transmits the audio file 430 to the audio device 108 via the communications interface 216. Upon receipt of the audio file 430, the audio device 108 may play the audio file 430.

Figure 5:
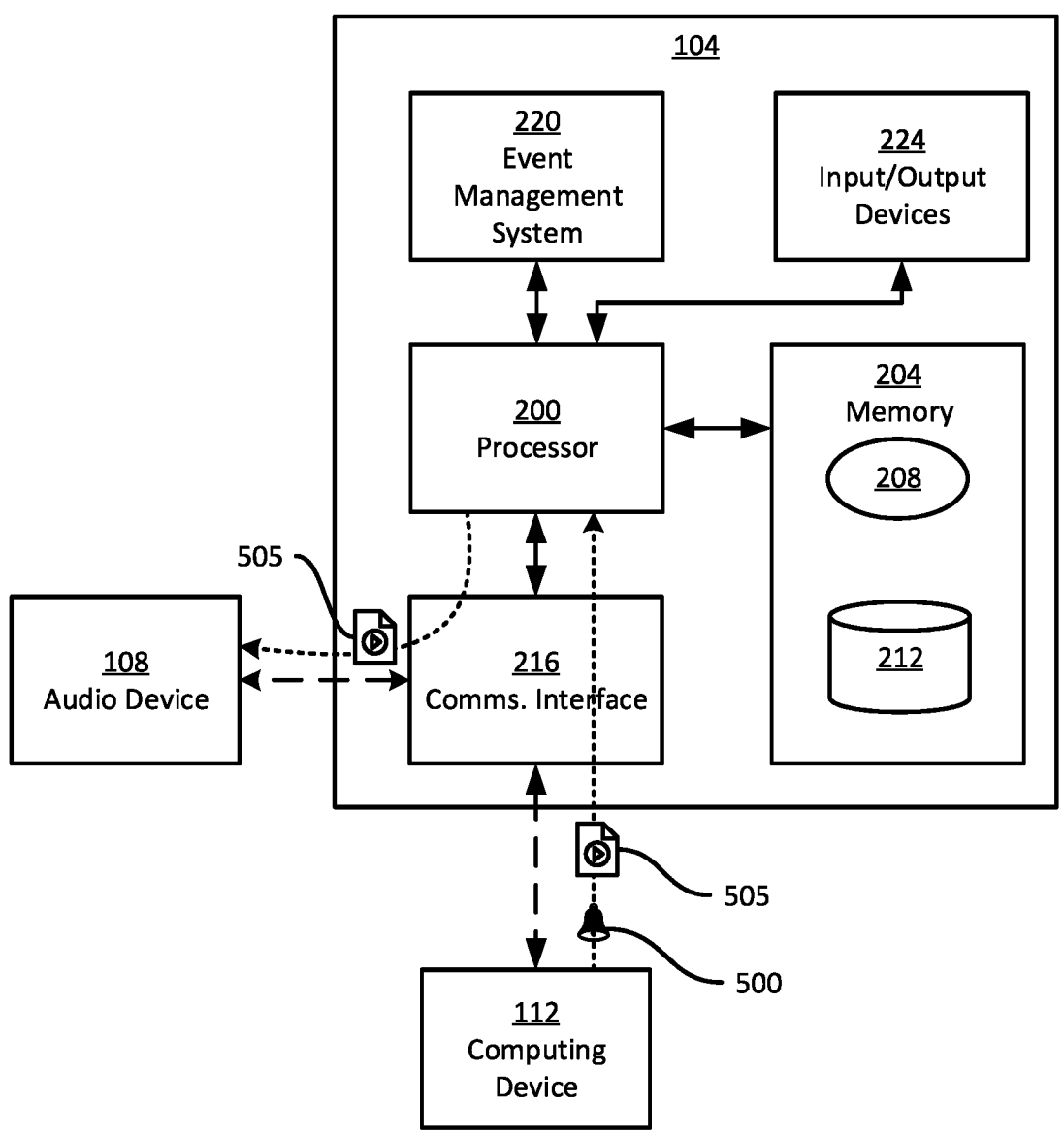
FIG. 5 is a schematic diagram of another example performance of the method of FIG. 4A.

Turning to FIG. 5, another example performance of the method 400 is depicted. In particular, the processor 200 may receive a secondary command 500 from the computing device 112 via the communications interface 216. In addition to the secondary command 500, the processor 200 may receive an audio file 505 from the computing device 112 via the communications interface 216. Responsive to the secondary command 500 and having received the audio file 505 from the computing device 112, the processor 200 transmits the audio file 505 to the audio device 108 via the communications interface 216. Upon receipt of the audio file 505, the audio device 108 may play the audio file 505.

The secondary command 500 including the audio file 505 that is sent from the computing device 112 to the printing device 104 and then sent from the printing device 104 to the audio device 108 can be dynamically generated based on a specific print job being performed by the printing device 104, a task to be completed by the user based on a specific print job being performed by the printing device 104, task to be completed by the user based on at least one of a location of the printing device 104 (e.g., determined via beaconing or other radiofrequency technologies for determining the location of a device), an identity or role of the user (e.g., based on the username of the user logged into the printer), and/or a combination thereof. As an example, in a scenario where a user is working in a shipment facility with the printing device 104 (e.g., a mobile printer) clipped to his/her belt, the user's job can be to monitor bins and when a bin is filled with objects, the printing device 104 can be used to print a label indicating the bin can be moved to distribution. Conventionally, the user must manually refer the bin number on the printed label to navigate around the facility. However, in accordance with embodiments of the present disclosure, the computing device 112 (e.g., operating as a centralized server) can transmit a secondary command to the printing device 108, which in response, sends an audio file to the audio device (e.g., a headset worn by the user), where the audio file is generated dynamically to indicate the bin number to be included on the printed label. In this way, the user will know where exactly he/she must go without looking at the details on the printed label.

In one example, the audio file can be generated by the computing device 112 based on print job to be performed by the printing device 104, a location of the printing device 104, an identify of the user, and/or a combination thereof. When the location of the printing device 104 can be determined by the computing device 112 (e.g., using real-time location tracking software, such as Motion Works' enterprise software system from Zebra Technologies Corp. and beacons), the computing device 112 can locate a printing device (e.g., the printing device 104) out of several printing device to which it is in communication as being near and/or closest to a filled bin using the real-time location tracking software and beacons from the printing device 104 and can send the audio command to the printing device 104. The real-time location tracking software can collect, manage, and analyze information about the location of the printing device 104, the audio device 108, the user of the printing device 104 and/or audio device 108, equipment and/or objects to receive labels printed by the printing device 104, and the like. In some examples, the audio file can be generated by the printing device 104, where the printing device 104 can receive text in the secondary command and the printing device can convert the text to the audio file and transmit the audio file to the audio device 108.

Figure 6A:
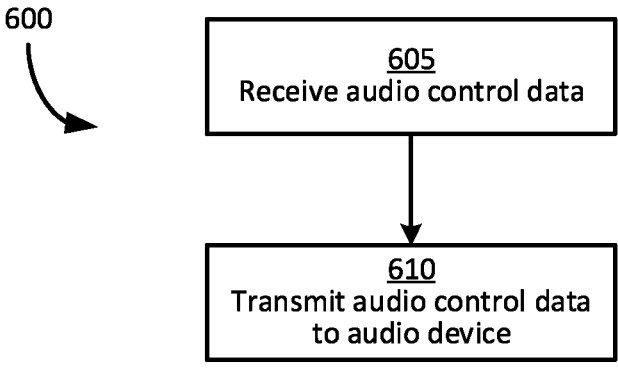
FIG. 6A is a flowchart of a method of controlling audio playback parameters at a connected audio device.

Turning now to FIG. 6, a method 600 of controlling audio playback at a connected audio device is depicted. The method 600 will be described in conjunction with its performance in the system 100, and in particular by the printing device 104.

In one example, the computing device 112 (e.g., a server) can be in communication with several printing devices (including the printing device 104) and can determine a location of each of the printing devices. The communication device may have a command queued with an audio file (or text to converted to an audio file by a selected printing device), the command and audio file can be location dependent such that the computing device 112 identifies and selects one of the printers in proximity to a target location (e.g., can select the closest printing device to the location or can select any printing device within a specified distance to the target location). For example, the computing device 112 can select the printing device 104 as being in proximity to the target location and can transmit the command and audio file or text to the printing device 104 and the printing device can send the audio file to the audio device 108 with which the printing device is in communication to provide, e.g., an audio signal including instructions for the user regarding a task to be performed by the user. The command may also include a print command that instructs the printing device 104 to perform a print job (e.g., to print a label) to be used by the user when executing the instructions. The user may have no a priori knowledge of the print job and may rely on the instructions provided by the audio file to perform a task at the location (e.g., place the label on bin A and move bin A to a specified location A).

At block 605, the printing device 104 receives audio control data. The audio control data may include commands to control various parameters of the audio playback. For example, the audio control data may include volume control, bass and/or other equalization data, and the like. The audio control data may be received as input from an operator of the printing device 104 at the input device 224.

At block 610, the printing device 104 transmits the audio control data received at block 605 to the audio device 108. In some examples, where the audio control data is received in accordance with a profile compatible for transmission to the audio device 108, the printing device 104 transmits the audio control data as received directly to the audio device 108. In other examples, the printing device 104 may perform some preprocessing on the audio control data, for example to convert it to a format recognizable and accessible by the audio device 108. The formats may vary depending on the capabilities of the audio device 108 and the type of communication link 106. For example, when the communication link 106 utilizes a Bluetooth communication protocol, the processor 200 may format the audio control data according to a low-complexity subband codec format to be sent to the audio device 108. In an embodiment, the audio file may be transmitted using an Advanced Audio Distribution Profile (A2DP) over a radio-frequency wireless connection utilizing the Bluetooth communication protocol.

Figure 6B:
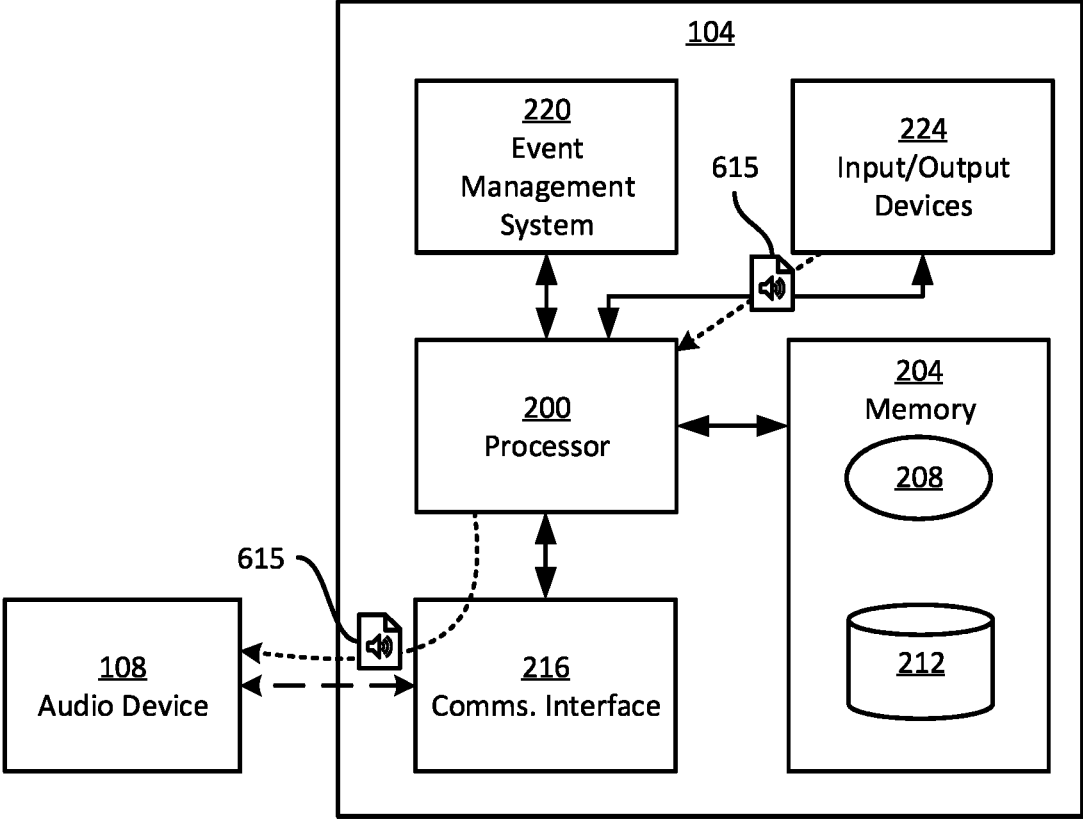
FIG. 6B is a schematic diagram of an example performance of the method of FIG. 6A.

Referring to FIG. 6B, the processor 200 may receive audio control data 615 from the input device 224 (i.e., at block 605). The audio control data 615 in the present example, may be volume control data to change the volume of the audio file being played at the audio device 108. As will be appreciated, the user interface may be controlled to allow a user to provide volume control data (or other audio control data 615) at the input device 224. Responsive to receiving the audio control data 615, the processor 200 transmits the audio control data 615 to the audio device 108 via the communications interface 216. Upon receipt of the audio control data 615, the audio device 108 may change the parameters of playback of the audio file in accordance with the audio control data 615. For example, the audio device 108 may lower or raise the volume during playback of the audio file in accordance with the audio control data 615. As will be appreciated, the audio device 108 may additionally allow for audio parameter control via its own input mechanisms in accordance with its normal operation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:
1. A system comprising:
a server; and
a printing device in communication with the server, the printing device comprising:
a memory configured to store audio files corresponding to printing device events;
one or more communications interface configured to:
communicate with a user of the printing device via an audio device;
wirelessly communicate with the audio device; and
emit a beacon to facilitate tracking a location of the printing device;
a processor interconnected with the memory and the communications interface, the processor configured to:
obtain a first audio file from the memory of the printing device in response to a first command, the first audio file based on a print job being executed by the printing device;
receive a second audio file from the server in response to a second command, the second audio file being dynamically generated by the server using a text-to-speech conversion based on the print job and user interaction with the printing device; and transmit via the communications interface, a third audio file to the audio device to provide information related to the print job and to a task for the user based on an output of the print job, the third audio file being formed by concatenating the first audio file and the second audio file, wherein the second audio file includes an audio instruction for the user to perform a task related to an output of the print job based on the user's role and the location of the printing device determined by the server using location tracking to analyze beacon data, the server selecting the printing device from a plurality of printing devices based on the printing device's proximity to a target location, and wherein the audio instruction directs the user to perform the task at the target location.

2. The printing device of claim 1, wherein the processor is further configured to:

subscribe to an event management system of the printing device, the event management system configured to track the printing device events; and receive a notification of the printing device event from the event management system.

3. The printing device of claim 1, wherein the processor is further configured to, responsive to audio control data input at a user interface of the printing device, transmit the audio control data to the audio device to change an audio parameter of the audio file played at the audio device.

4. The printing device of claim 1, wherein the audio file comprises one of: a specific audio file containing an audio descriptor of the printing device event; and a generic audio file containing a generic audio descriptor for a type of the printing device event.

5. The printing device of claim 1, wherein the communications interface is configured to communicate with the audio device using a short-range wireless communications protocol.

6. The printing device of claim 5, wherein the short-range wireless communications protocol comprises Bluetooth.

7. A method in a printing device, the method comprising:

identifying an occurrence of an event;

emitting a beacon to facilitate tracking a location the printing device;

obtain a first audio file from memory of the printing device in response to a first command, the first audio file based one a print job being executed by the printing device;

receiving a second audio file from a server in response to a second command, the second audio file being dynamically generated using a text-to-speech conversion based on the print job and user interaction with the printing device; and transmitting a third audio file from the printing device to an audio device via a wireless connection to provide information related to the print job and a task for a user based on an output of the print job, the third audio file being formed by concatenating the first audio file and the second audio file, wherein the second audio file includes an audio instruction for the user to perform a task related to an output of the print job based on the user's role and a location of the printing device determined by the server using location tracking to analyze beacon data, the server selecting the printing device from a plurality of printing devices based on the printing device's proximity to a target location, and wherein the audio instruction directs the user to perform the task at the target location.

8. The method of claim 7, further comprising:

subscribing to an event management system of the printing device, the event management system configured to track the occurrence of the event; and receiving a notification of the event from the event management system.

9. The method of claim 7, further comprising: responsive to audio control data input at a user interface of the printing device, transmitting the audio control data to the audio device to change an audio parameter of the audio file played at the audio device.

10. The method of claim 7, wherein the audio file comprises one of: a specific audio file containing an audio descriptor of the printing device event or a generic audio file containing a generic audio descriptor for a type of the printing device event.

11. The method of claim 7, comprising communicating with the audio device using a short-range wireless communications protocol.

12. A printing device comprising:

a user interface configured to receive user input from a user;

a memory configured to store a first audio file;

a communications interface configured to wirelessly communicate with an audio device and to emit a beacon to facilitate tracking a location of the printing device;

a processor interconnected with the user interface, the memory and the communications interface, the processor configured to:

responsive to an event of an event type, attempt to obtain a specific audio file for the event type from the memory of the printing device;

in response to failing to obtain the specific audio file from the memory, attempt to obtain a generic audio file from the memory;

receive a second audio file from a server in response to a second command, the second audio file being dynamically generated using a text-to-speech conversion based on print job and user interaction with the printing device; and transmit via the communications interface, a third audio file to the audio device to provide information related to the print job and a task for a user based on an output of the print job, the third audio file being formed by concatenating the generic audio file and the second audio file, wherein the second audio file includes an audio instruction for the user to perform a task related to an output of the print job based on the user's role and a location of the printing device determined by the server using location tracking to analyze beacon data, the server selecting the printing device from a plurality of printing devices based on the printing device's proximity to a target location, and wherein the audio instruction directs the user to perform the task at the target location.

* * * * *